US010120502B2

(12) United States Patent
Yang et al.

(10) Patent No.: US 10,120,502 B2
(45) Date of Patent: Nov. 6, 2018

(54) ARRAY SUBSTRATE, TOUCH DISPLAY PANEL AND DISPLAY APPARATUS CONTAINING THE SAME, AND METHOD FOR DRIVING THE TOUCH DISPLAY PANEL

(71) Applicants: BOE TECHNOLOGY GROUP CO., LTD, Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Hailin Xue, Beijing (CN); Xiaochuan Chen, Beijing (CN); Haisheng Wang, Beijing (CN); Yingming Liu, Beijing (CN); Rui Xu, Beijing (CN); Weijie Zhao, Beijing (CN); Lei Wang, Beijing (CN); Xiaoliang Ding, Beijing (CN); Changfeng Li, Beijing (CN)

(73) Assignees: BOE TECHNOLOGY GROUP CO., LTD., Beijing (CN); BEIJING OPTOELECTRONICS TECHNOLOGY CO., LTD., Beijing (CN)

(*) Notice: Subject to any disclaimer, the term of this patent is extended or adjusted under 35 U.S.C. 154(b) by 31 days.

(21) Appl. No.: 15/122,798

(22) PCT Filed: Dec. 28, 2015

(86) PCT No.: PCT/CN2015/099234
§ 371 (c)(1),
(2) Date: Aug. 31, 2016

(87) PCT Pub. No.: WO2017/024733
PCT Pub. Date: Feb. 16, 2017

(65) Prior Publication Data
US 2017/0185222 A1    Jun. 29, 2017

(30) Foreign Application Priority Data

Aug. 13, 2015    (CN) .......................... 2015 1 0498317

(51) Int. Cl.
*G06F 3/041*    (2006.01)
*G06F 3/044*    (2006.01)
(Continued)

(52) U.S. Cl.
CPC .......... *G06F 3/0418* (2013.01); *G02F 1/1368* (2013.01); *G02F 1/13338* (2013.01);
(Continued)

(58) Field of Classification Search
CPC ........... G02F 1/13338; G02F 1/134309; G02F 1/13458; G02F 1/136286; G02F 1/1368;
(Continued)

(56) References Cited

U.S. PATENT DOCUMENTS 9,766,761 B2 *    9/2017    Wang ...................... G06F 3/044
2015/0153877 A1    6/2015    Han et al.

FOREIGN PATENT DOCUMENTS

CN    104020891 A    9/2014
CN    104020908 A    9/2014
(Continued)

OTHER PUBLICATIONS

The World Intellectual Property Organization (WIPO) International Search Report for PCT/CN2015/099234 dated May 6, 2016 p. 1-5.
(Continued)

*Primary Examiner* — Stephen G Sherman
(74) *Attorney, Agent, or Firm* — Anova Law Group, PLLC

(57) ABSTRACT

The present disclosure provides an array substrate. The array substrate includes a bottom substrate; a plurality of gate lines and a plurality of data lines arranged on the bottom
(Continued)

substrate for defining a plurality of subpixel regions; and a plurality of common electrode pads, each common electrode pad being located in a corresponding subpixel region, wherein one or more of the common electrode pads form a self-capacitance electrode.

18 Claims, 5 Drawing Sheets

(51) Int. Cl.
  *G02F 1/1362* (2006.01)
  *G02F 1/1345* (2006.01)
  *G02F 1/1368* (2006.01)
  *G02F 1/1343* (2006.01)
  *G02F 1/1333* (2006.01)

(52) U.S. Cl.
  CPC .... *G02F 1/13458* (2013.01); *G02F 1/134309* (2013.01); *G02F 1/136286* (2013.01); *G06F 3/044* (2013.01); *G06F 3/0412* (2013.01); *G02F 2001/134345* (2013.01); *G02F 2201/121* (2013.01); *G02F 2201/123* (2013.01); *G06F 2203/04111* (2013.01)

(58) Field of Classification Search
  CPC ... G02F 2001/134345; G02F 2001/121; G02F 2001/123; G06F 3/0412; G06F 3/0418; G06F 3/044; G06F 2203/04111
  USPC .......................................................... 345/174
  See application file for complete search history.

(56) References Cited

FOREIGN PATENT DOCUMENTS

| | | |
|---|---|---|
| CN | 204203592 U | 3/2015 |
| CN | 104536629 A | 4/2015 |
| CN | 105183253 A | 12/2015 |
| KR | 20140087483 A | 7/2014 |

OTHER PUBLICATIONS

State Intellectual Property Office of the P.R.C. (SIPO) Office Action 1 for 201510498317.7 dated Aug. 1, 2017 23 Pages (including translation).

* cited by examiner

ARRAY SUBSTRATE, TOUCH DISPLAY PANEL AND DISPLAY APPARATUS CONTAINING THE SAME, AND METHOD FOR DRIVING THE TOUCH DISPLAY PANEL

CROSS-REFERENCES TO RELATED APPLICATIONS

This application is a national phase entry under 35 U.S.C. § 371 of International Application No. PCT/CN2015/099234, filed on Dec. 28, 2015, which claims priority to Chinese Patent Application No. 201510498317.7 filed on Aug. 13, 2015. The above enumerated patent applications are incorporated by reference herein in their entirety.

FIELD OF THE INVENTION

The present invention generally relates to the display technologies and, more particularly, relates to an array substrate, a touch display panel containing the same, a display apparatus containing the same, and a method for driving the touch display panel.

BACKGROUND

Touch display panels often include external touch screen structure to implement touch functions. That is, an external touch screen is often attached onto the display panel so that the display panel has touch functions. However, external touch screen structure often makes the entire touch display panel bulky and heavy, which makes the touch display panels less desirable for users demanding display light and thin panels.

BRIEF SUMMARY OF THE DISCLOSURE

The present disclosure provides an array substrate, a display apparatus containing the array substrate, and a method for driving the array substrate. The disclosed array substrate may enable a display apparatus containing the array substrate to have touch functions without increasing the thickness or weight of the display apparatus.

One aspect of the present disclosure includes an array substrate. The array substrate includes a bottom substrate; a plurality of gate lines and a plurality of data lines arranged on the bottom substrate for defining a plurality of subpixel regions; and a plurality of common electrode pads, each common electrode pad being located in a corresponding subpixel region, wherein one or more of the common electrode pads form a self-capacitance electrode.

Optionally, a plurality of neighboring common electrode pads are configured to be the self-capacitance electrode.

Optionally, when a plurality of neighboring common electrode pads in a same row are connected together to form the self-capacitance electrode, the plurality of neighboring common electrode pads are connected through a conductive line.

Optionally, the plurality of neighboring common electrode pads are connected through a conductive line and a connecting structure.

Optionally, the connecting structure is located at an intersection of a gate line and a data line on the bottom substrate.

Optionally, the connecting structure and the common electrode pads are in a same layer and made of a same material.

Optionally, the array substrate further includes an insulating layer positioned between a layer containing a common electrode pad and a layer containing a corresponding gate line.

Optionally, the conductive line and the gate line are in a same layer and made of a same material.

Optionally, the conductive line is a common electrode signal line, the processing unit applying common electrode signals on the common electrode pads during a display period.

Optionally, the array substrate further includes a via hole formed in the insulating layer for connecting the common electrode pad and the corresponding gate line.

Optionally, a plurality of via holes have a same size; and distances between the plurality of via holes and corresponding common electrode pads are same.

Optionally, a distance between centers of two adjacent self-capacitance electrodes is about 10 mm.

Optionally, a length of the self-capacitance electrode along a row direction is about (3.85±0.15) mm; and a length of the self-capacitance electrode along a column direction is about (3.85±0.15) mm.

Optionally, a ratio of the length of the self-capacitance electrode along the row direction to the length of the self-capacitance electrode along the column direction is greater than 95% and less than 105%.

Optionally, the array substrate further includes a top substrate, a plurality of thin-film transistors (TFTs) and a plurality of pixel electrodes placed in the subpixel regions between the top substrate and the bottom substrate, a gate of a TFT being connected to a gate line, a source of the TFT being connected to a data line, and a drain of the TFT being connected to a pixel electrode.

Another aspect of the present disclosure provides a touch display panel, including one or more of the disclosed array substrates.

Optionally, the touch display panel comprises a processing unit for detecting a touch motion by reading signals from the self-capacitance electrode.

Optionally, the processing unit detects a capacitance change on the self-capacitance electrode to determine a location of the touch motion.

Another aspect of the present disclosure provides a display apparatus, including one or more of the disclosed display panels.

Another aspect of the present disclosure provides a method for driving a disclosed touch display panel. The method includes in a display period, the processing unit applying a common electrode signal on the common electrode pads; and in a touch-sensing period, the processing unit applying a touch signal on the self-capacitance electrodes and determining a location of the touch motion based on the capacitance change on the self-capacitance electrodes, wherein the touch display panel displays a frame during the display period and the touch sensing-period.

Optionally, the touch signal is a periodic pulse signal.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

One aspect of the present disclosure provides an array substrate.

Figure 1:
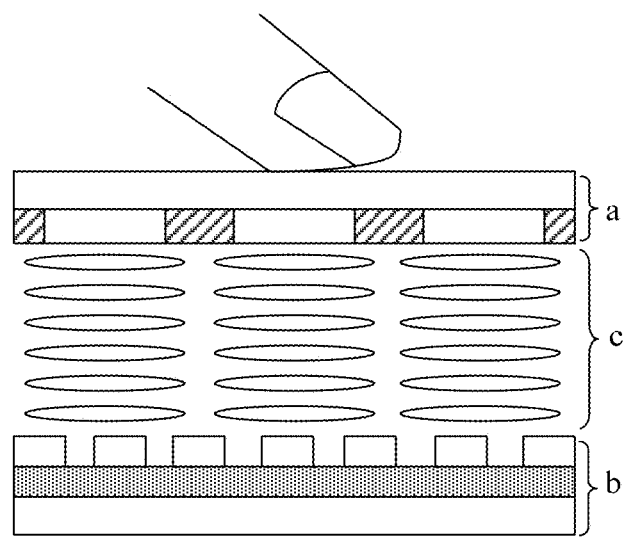
FIG. 1 illustrates a cross-sectional view of an exemplary array substrate according to the embodiments of the present disclosure.
Figure 2:
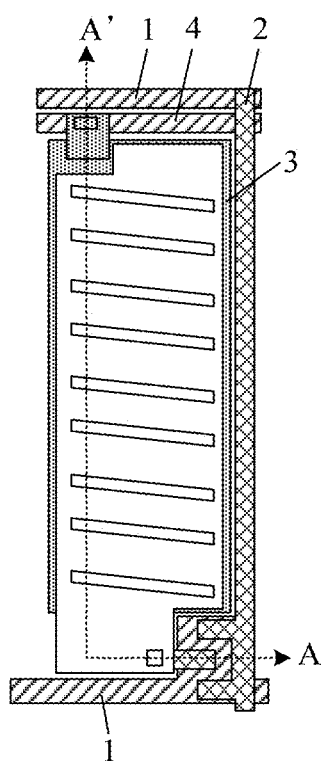
FIG. 2 illustrates a top view of an exemplary bottom substrate according to the embodiments of the present disclosure.
Figure 3:
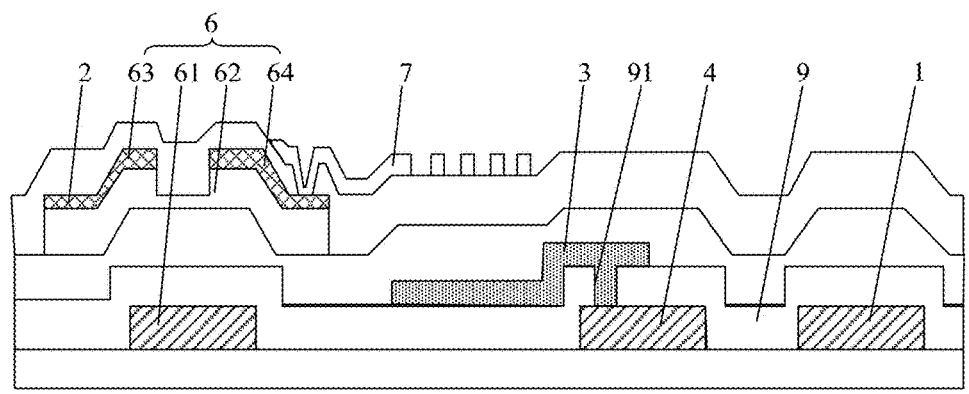
FIG. 3 illustrates a cross-sectional view of the array substrate in FIG. 1 along the A-A' directions.
Figure 4:
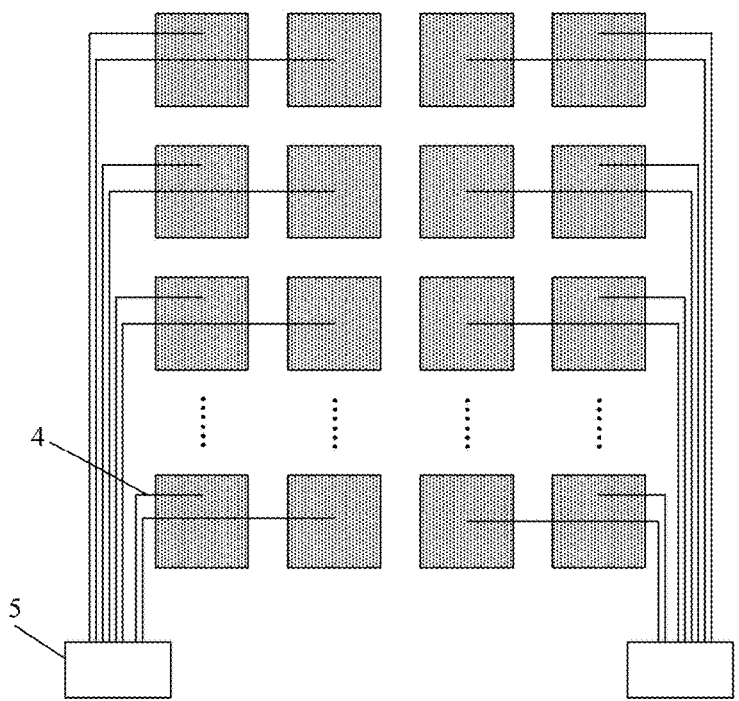
FIG. 4 illustrates another top view of an exemplary bottom substrate according to the embodiments of the present disclosure.

As shown in FIG. 1, the array substrate may include a top substrate and a bottom substrate b facing each other. Specifically, as shown in FIGS. 2 and 3, the bottom substrate b may include a plurality of gate lines 1 and a plurality of data lines 2. The plurality of gate lines 1 and the plurality of data lines 2 may define a plurality of subpixel regions. Each subpixel region may include a common electrode pad 3. As shown in FIG. 4, a common electrode pad (corresponding to the common electrode pad 3 in FIG. 3) may also be used as a self-capacitance electrode, which is shown as rectangular-shaped structures in FIG. 4. The array substrate may also include a processing unit 5, e.g., a touch-sensing chip. As shown in FIG. 4, each self-capacitance electrode may be connected to an output terminal of the processing unit 5 through at least one line or conductive line. The processing unit 5 may be used to load and/or read touch signals on the self-capacitance electrodes during the touch-sensing periods. The processing unit 5 may also determine the location of a touch motion by detecting or sensing the capacitance change on the self-capacitance electrodes.

In the array substrate provided by the embodiments of the present disclosure, a plurality of self-capacitance electrodes may be formed or arranged on the bottom substrate of the array substrate according to the working principles of self-capacitance. The plurality of self-capacitance electrodes may be arranged in the same layer and may be independent of each other. When a user is not touching the array substrate, the capacitance on a self-capacitance electrode may be a fixed capacitance value. When the user is touching the array substrate, the human capacitance of the user may be added to the fixed capacitance value of the self-capacitance electrodes being touched. That is, the capacitance on the self-capacitance electrode being touched may be the sum of the human capacitance and the fixed capacitance value. The processing unit may be able to determine the location of the touch motion by sensing the capacitance change on the self-capacitance electrodes. Because the human capacitance can be applied on all self-capacitance electrodes, compared to the projected capacitance that can only be applied on mutual-capacitance, the capacitance change caused by the touch motion of a human body may be greater. The signal-to-noise ratio of the touch-sensing process may be improved. The accuracy of the touch-sensing process can be improved accordingly.

For example, as shown in FIG. 1, the array substrate may also include a liquid crystal (LC) layer c positioned between the top substrate a and the bottom substrate b. A black matrix and a color filter layer may be arranged on the top substrate a. When the array substrate is in operation, a finger may touch the top substrate a on the surface facing away from the bottom substrate b. The capacitance of some self-capacitance electrodes (e.g., common electrode 3) on the bottom substrate b may be affected by the touch motion.

Further, as shown in FIG. 3, the array substrate provided by the embodiments of the present disclosure may further include a plurality of thin-film transistors (TFTs) 6 and a plurality of pixel electrodes 7 in the subpixel regions of the bottom substrate b. A pixel electrode 7 may have a slit shape or a strip shape. A TFT 6 may include a gate 61, an active layer 62, a source 63, and a drain 64. The gate 61 may be connected to a gate line 1. The source 63 may be connected to a data line 2, and the drain 64 may be connected to a pixel electrode 7. The display mode of the array substrate may be the advanced fringe field switching (AFFS) mode. In an array substrate operated under the AFFS display mode, electrodes positioned in the same plane may generate fringe electric field, and the fringe electric field may enable the LC molecules between adjacent electrodes and right above electrodes to rotate in a plane parallel to the array substrate. The brightness and color contrast of the array substrate may be greatly improved. The array substrate may have wider viewing angles. Ripple effect may be avoided or reduced. The display performance of the array substrate may be improved.

In the embodiments of the present disclosure, the common electrode pad 3 and the pixel electrode 7 may be made of any suitable conductive material with substantial transparency such as indium tin oxide (ITO). The gate 61 and the gate line 1 may be arranged in the same layer and made of a same material. The gate 61 and the gate line 1 may be formed in a same fabrication step so that the fabrication of the bottom substrate b may be simpler and less costly. Similarly, the source 63 and the drain 64 may be arranged in the same layer as the data line 2. The source 63 and the drain 64 may be made of a same material and formed in a same fabrication step so that the fabrication of the bottom substrate b may be simpler. The cost for fabricating the bottom substrate b may be further reduced. In addition, the common electrode pads 3 may have little or no overlap with the data lines and the gate lines, in a touch-sensing period, the capacitance between the self-capacitance electrodes (i.e., common electrodes 3) and the data lines 2/gate lines 1 are sufficiently small, the touch performance of the array substrate can be improved.

In addition, for the array substrate to have high resolution, the sizes of a subpixel region and a pixel electrode 7 may be sufficiently small. However, for the array substrate to have more desirable touch-sensing performance, the size of the self-capacitance electrode (i.e., common electrodes 3) should be sufficiently large so that the size of self-capacitance electrode may be comparable to the touched spot on the array substrate. That is, the size of one common electrode pad 3 may not be large enough for the size of the self-capacitance electrode. If one common electrode pad 3 is directly used as a self-capacitance electrode, the array substrate may not be able to have a desirably high resolution and a desirable touch-sensing performance. To solve the problems, in the embodiments provided by the present disclosure, as shown in FIGS. 2, 3, and 4, a plurality of neighboring common electrode pads 3 may be connected together to be used as a self-capacitance electrode. Thus, it can be ensured that the size of a self-capacitance electrode may match the size of the touched spot on the array substrate when the sizes of the single common electrode pad 3 is small. The array substrate may have desirably high resolution and improved touch-sensing performance.

Further, to connect the plurality of neighboring common electrode pads 3, in the embodiments provided by the present disclosure, a plurality of neighboring first common electrode pads 3 in a same row maybe used as a self-capacitance electrode TX. As shown in the dashed box in FIG. 5, a plurality of first common electrode pads 3 in the first row may be connected together by a conductive line 4. If a plurality of first common electrode pads 3 in at least two neighboring rows is used as a self-capacitance electrode TX, as shown in the dashed box in FIG. 6, the first common electrode pads 3 in a same row may be connected by a conductive line 4, and the first common electrode pads 3 in adjacent rows may be connected by connecting structures 8. A connecting structure 8 may be positioned at the intersection of a gate line 1 and a data line 2 on the bottom substrate b. Further, the connecting structures 8 and the common electrode pads 3 may be arranged in the same layer and may be made of a same material. That is, a connecting structure 8 and the corresponding common electrode pads 3 may be considered as one piece or one structure. No additional via holes are needed for connecting the common electrode pads 3 to the connecting structures 8. That is, the common electrode pads 3 and the connecting structures 8 may be formed in a same fabrication step. The fabrication of the bottom substrate b may be simpler.

When a plurality of neighboring common electrode pads 3 are connected to be used as a self-capacitance electrode TX, in some embodiments of the present disclosure, a distance between the centers of any two adjacent self-capacitance electrodes TX may be about 10 mm so that the distance may match the gap between two fingers. The array substrate may have improved touch-sensing performance. The length of a self-capacitance electrode TX along a row direction may be about (3.85±0.15) mm. The length of a self-capacitance electrode TX along a column direction may be about (3.85±0.15) mm. The size of a self-capacitance electrode may match or be comparable to the size of the touched spot on the array substrate. Thus, the array substrate may have improved touch-sensing functions. Of a self-capacitance electrode TX, the ratio of the length along the row direction to the length along the column direction may be greater than 95% and less than 105%, i.e., the difference in lengths of a self-capacitance electrode TX along the row direction and the column direction is less than 5%, so that the touch-sensing performance of the array substrate may be substantially consistent or the same along the row direction and the column direction. The touch-sensing performance of the array substrate may be uniformed.

It should be noted that, the sizes, associated with the self-capacitance electrodes TX, mentioned in the present disclosure, may refer to the areas that the common electrode pads 3 are positioned. For example, the distance between the centers of any two adjacent self-capacitance electrodes TX may be the distance between the centers of the two areas in which the two self-capacitance electrodes TX are located. The length of a self-capacitance electrode along the row direction may be the length of the area the self-capacitance electrode TX is located in along the row direction. The length of a self-capacitance electrode TX along the column direction may be the length of the area the self-capacitance electrode TX is located in along the column direction. The row direction may be parallel to the gate line 1. The column direction may be parallel to the data line 2.

Further, in some embodiments, referring back to FIG. 3, an interlayer insulating layer 9 may be formed between the layer containing the common electrode pad 3 and the layer containing the corresponding gate line 1 so that the distance between the gate line 1 and the common electrode pad 3 may be sufficiently long and the parasitic capacitance formed between the gate line 1 and the common electrode pad 3 may be sufficiently small. Because at least one common electrode pad 3 may be used as a self-capacitance electrode TX, the sufficiently small parasitic capacitance between the self-capacitance electrode TX and the gate line 1 may improve the sensitivity of the array substrate. The power consumption of the array substrate may be reduced, and the touch-sensing performance of the array substrate may be improved.

Figure 5:
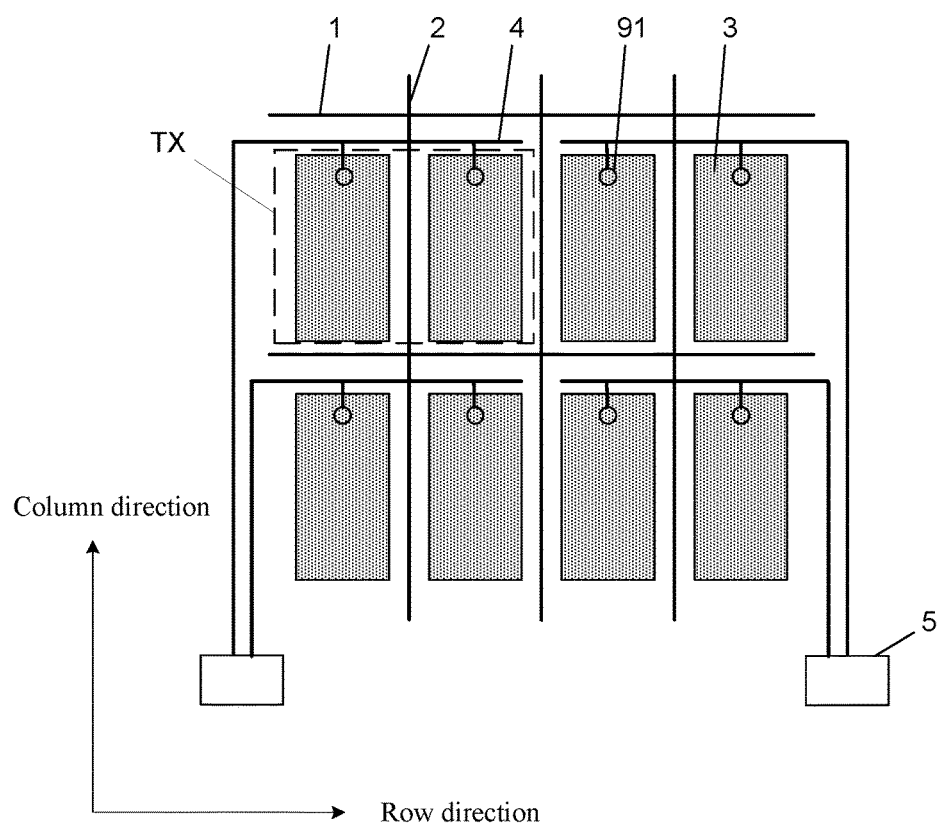
FIG. 5 illustrates another top view of an exemplary bottom substrate according to the embodiments of the present disclosure.
Figure 6:
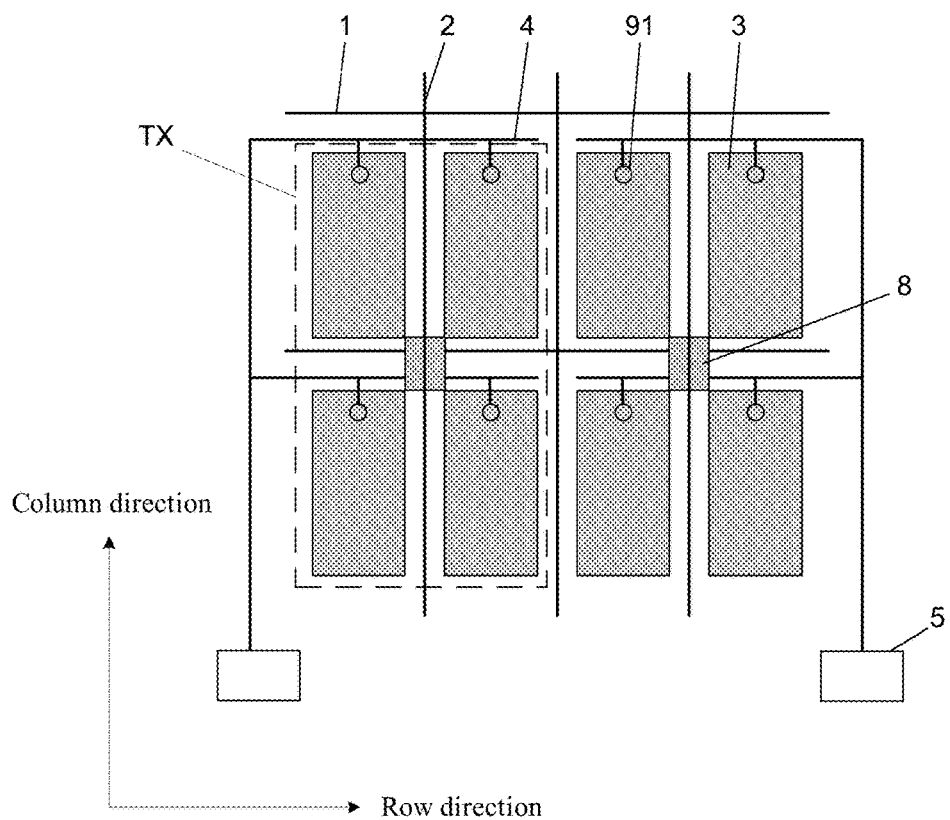
FIG. 6 illustrates another top view of an exemplary bottom substrate according to the embodiments of the present disclosure.

For example, as shown in FIG. 3, in the embodiments of the present disclosure, the conductive line 4 and the gate line 1 may be formed in the same layer and made of the same material. The conductive line 4 and the gate line 1 may be formed in a same fabrication step. The fabrication of the bottom substrate b may be simpler and the cost to fabricate the bottom substrate b may be reduced. In some embodiments, as shown in FIGS. 5 and 6, the conductive line 4 may be a common electrode line. The common electrode line is arranged parallel to the gate line 1, and the orthogonal projection of the common electrode line on the bottom substrate 4 may be between the orthogonal projection of the common electrode pad 3 on the bottom substrate 4 and the orthogonal projection of the gate line 1 on the bottom substrate 4. Thus, when the conductive line 4 is a common electrode line, the arrangement of the conductive line 4 should not reduce the aperture ratio of the bottom substrate b. Display performance of the display panel would not be impaired. The processing unit 5 may also be used to load and/or read common electrode signals on the common electrode pads 3 during display periods. The integration level of the processing unit 5 may be improved, and the structure of the array substrate may be simpler.

A plurality of via holes may be formed on the bottom substrate b. As shown in FIGS. 1, 5, and 6, a via hole 91 may be formed in the interlayer insulating layer 9. The conductive line 4 may be connected to the common electrode pad 3 through the via hole 91. Further, in some embodiments, the sizes of via holes 91 corresponding to the common electrode pads 3 may be the same, and the relative distances between a via hole 91 and the corresponding common electrode pad 3 may be the same. Thus, the electrical properties of each common electrode pad 3 may be consistent or same. The array substrate may have uniformed display effect and touch-sensing performance. It should be noted that, there may be many ways to connect a conductive line 4 and a common electrode pad 3. The specific configuration to connect a conductive line and a common electrode pad 3 may not be limited by the present disclosure.

As described above, a common electrode pad may be arranged in each subpixel region, at least one common electrode pad may be used as a self-capacitance electrode. A self-capacitance electrode may be connected to an output terminal of the processing unit through at least one conductive line. The processing unit may load and/or read touch signals on the self-capacitance electrodes during touch-sensing periods. The processing unit may also determine the location of the touch motion by detecting the capacitance change on the each self-capacitance electrode. Thus, no additional touch screen needs to be attached onto a display panel to implement touch functions in the display panel. The thickness of the display panel should not be increased. The disclosed array substrate may be more suitable for a thinner and lighter design.

Another aspect of the present disclosure provides a touch display panel. The touch display panel may include one or more of the disclosed array substrate to execute touch and displaying functions.

Another aspect of the present disclosure provides a method for driving the touch display panel. The method may be used to drive the disclosed touch display panel.

Figure 7:
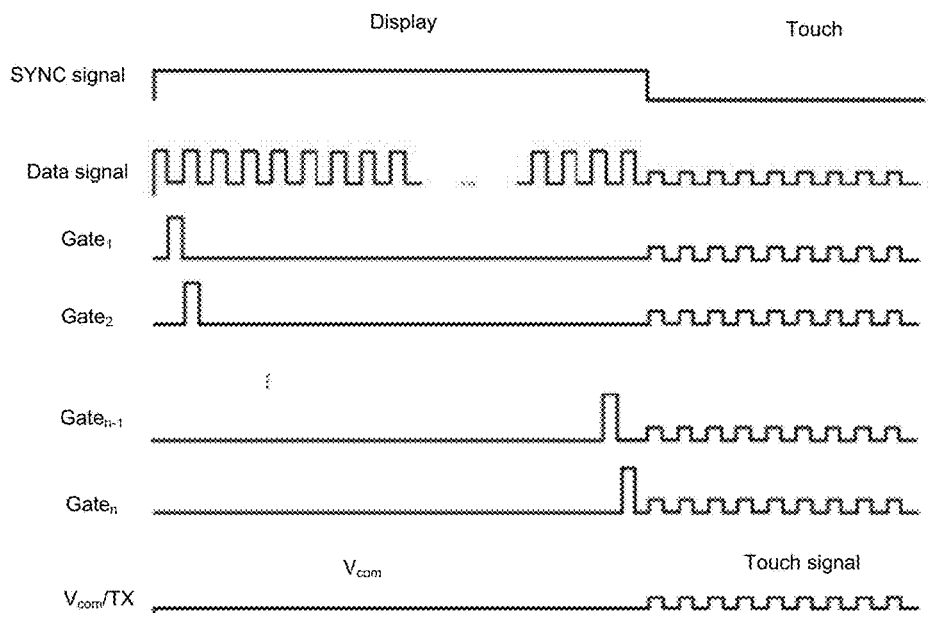
FIG. 7 illustrates an exemplary timing diagram of the operation of an array substrate according to the embodiments of the present disclosure.

A timing diagram for the driving process using the disclosed method is illustrated in FIG. 7.

First, a frame may be divided into a display period and a touch-sensing period by the processing unit. The display period is represented by "Display" in FIG. 7 and the touch-sensing period is represented by "Touch" in FIG. 7. For illustrative purposes, FIG. 7 only shows one display period and one touch-sensing period, i.e., one frame. In the display period, the processing unit may load a common electrode signal, shown as the "$V_{com}$" in FIG. 7, on the common electrode pads 3. In some embodiments, the common electrode signals may be DC signals. Meanwhile, in the display period, perpendicular scanning signal, shown as the SYNC signal in FIG. 7 may be high, gate lines may be turned on sequentially, and display data signals, shown as the "Data signal" may be applied on the data lines. For example, in FIG. 7, the $1^{st}$ gate line (shown as $Gate_1$ in FIG. 7) to the $n^{th}$ gate line (shown as $Gate_n$ in FIG. 7) may be turned on sequentially.

In the touch-sensing periods, the processing unit may load and/or read a touch signal on the self-capacitance electrodes, as shown in FIG. 7. The processing unit may determine the location of the touch motion based on the capacitance change on the self-capacitance electrodes. For example, the touch signal may be a periodic pulse signal. At least one common electrode pad 3 may be used as a self-capacitance electrode. Meanwhile, in the touch-sensing periods, the SYNV signal may be low, and the signals applied on the gate lines and the data lines may have a same shape, e.g., a periodic pulse signal, as the touch signal. In practice, the signals applied on the gate lines and the data lines may have different shapes. Thus, the effect, imposed by the signals on the gate lines and data lines, on the touch signals on the self-capacitance electrodes may be avoided or reduced. The array substrate may have improved sensitivity and reduced power consumption. The touch performance of the array substrate may be improved. Because the method can be used to drive the disclosed embodiments of array substrates, the method may improve the sensitivity of the array substrate and reduce the power consumption of the array substrate. The method may also improve the touch performance of the array substrate.

Figure 8:
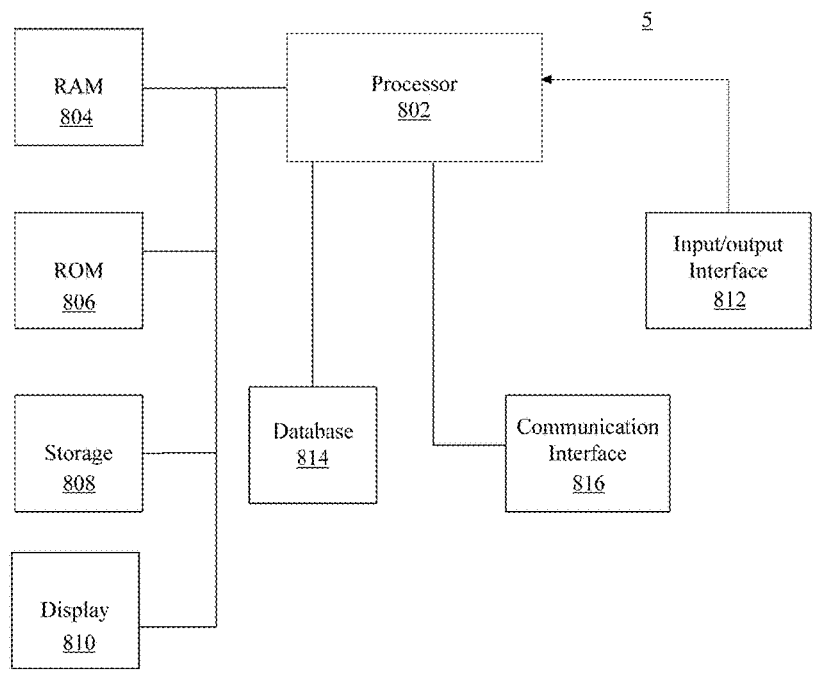
FIG. 8 illustrates a block diagram of a processing unit according to the embodiments of the present disclosure.

FIG. 8 illustrates the block diagram of the processing unit 5 according to the embodiments of the present disclosure. The processing unit 5 or system may accept, process, and execute commands from the array substrate. The processing unit 5 may include any appropriately configured computer system. As shown in FIG. 8, system 5 may include a processor 802, a random access memory (RAM) unit 804, a read-only memory (ROM) unit 806, a storage unit 808, a display 810, an input/output interface unit 812, a database 814; and a communication interface 816. Other components may be added and certain devices may be removed without departing from the principles of the disclosed embodiments.

Processor 802 may include any appropriate type of general purpose microprocessor, digital signal processor or microcontroller, and application specific integrated circuit (ASIC). Processor 802 may execute sequences of computer program instructions to perform various processes associated with system 5. Computer program instructions may be loaded into RAM 804 for execution by processor 802 from read-only memory 806, or from storage 808. Storage 808 may include any appropriate type of mass storage provided to store any type of information that processor 802 may need to perform the processes. For example, storage 808 may include one or more hard disk devices, optical disk devices, flash disks, or other storage devices to provide storage space.

Display 810 may provide information to a user or users of the system 5. Display 810 may include any appropriate type of computer display device or electronic device display (e.g., CRT or LCD based devices). Input/output interface 812 may be provided for users to input information into system 5 or for the users to receive information from system 5. For example, input/output interface 812 may include any appropriate input device, such as a keyboard, a mouse, an electronic tablet, voice communication devices, or any other optical or wireless input devices. Further, input/output interface 812 may receive from and/or send to other external devices.

Further, database 814 may include any type of commercial or customized database, and may also include analysis tools for analyzing the information in the databases. Database 814 may be used for storing information for semiconductor manufacturing and other related information. Communication interface 816 may provide communication connections such that system 5 may be accessed remotely and/or communicate with other systems through computer networks or other communication networks via various communication protocols, such as transmission control protocol/internet protocol (TCP/IP), hyper text transfer protocol (HTTP), etc.

In one embodiment, a user may touch the array substrate. The processor 802 may receive, process, and execute the commands to obtain data from the self-capacitance electrodes to detect the touch motion. Suitable data may be stored in ROM 806 and storage 808 to be processed. After the data is processed, result, e.g., location, of the touch motion can be obtained. The result can be returned to the user via the display 810 or the input/output interface 812.

Another aspect of the present disclosure provides a display apparatus. The display apparatus may incorporate one or more of the above-mentioned display panels. The display apparatus according to the embodiments of the present disclosure can be used in any product with display functions such as a television, an electronic paper, a digital photo frame, a mobile phone and a tablet computer. Because the display apparatus contains the disclosed touch display panel, the display apparatus may also have improved sensitivity, reduced power consumption, and the improved touch performance.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. An array substrate, comprising:
   a bottom substrate;
   a plurality of gate lines and a plurality of data lines arranged on the bottom substrate for defining a plurality of subpixel regions; and
   a plurality of common electrode pads, each common electrode pad being located in a corresponding subpixel region,
   wherein:
      two or more neighboring ones of the common electrode pads that are in a same row form at least a portion of a self-capacitance electrode,
      the two or more neighboring ones of the common electrode pads in the same row are connected by a common electrode signal line through via holes,
      the common electrode signal line and the plurality of gate lines are formed in a same layer, and
      one of the plurality of gate lines and the common electrode signal line are arranged in a gap between two adjacent rows of the common electrode pads.

2. The array substrate according to claim 1, wherein the self-capacitance electrode further includes at least another one of the common electrode pads that is in a different row than the two or more neighboring ones of the common electrode pads in the same row, the at least another one of the common electrode pads in a different row is connected to the two or more neighboring ones of the common electrode pads by a connecting structure.

3. The array substrate according to claim 2, wherein the connecting structure is located at an intersection of a gate line and a data line on the bottom substrate.

4. The array substrate according to claim 3, wherein the connecting structure and the common electrode pads are in a same layer and made of a same material.

5. The array substrate according to claim 1, further including an insulating layer positioned between a layer containing a common electrode pad and a layer containing a corresponding gate line.

6. The array substrate according to claim 5, wherein: one of the via holes is formed in the insulating layer and connects a common electrode pad and a corresponding common electrode signal line.

7. The array substrate according to claim 6, wherein the via holes have a same size; and distances between the via holes and corresponding common electrode pads are same.

8. The array substrate according to claim 1, wherein the common electrode signal line and the plurality of gate lines are made of a same material.

9. The array substrate according to claim 1, further comprising:
   a processing unit applying common electrode signals on the common electrode pads during a display period.

10. The array substrate according to claim 1, wherein a distance between centers of two adjacent self-capacitance electrodes is about 10 mm.

11. The array substrate according to claim 1, wherein:
    a length of the self-capacitance electrode along a row direction is about $(3.85\pm0.15)$ mm; and a length of the self-capacitance electrode along a column direction is about $(3.85\pm0.15)$ mm.

12. The array substrate according to claim 11, wherein:
    a ratio of the length of the self-capacitance electrode along the row direction to the length of the self-capacitance electrode along the column direction is greater than 95% and less than 105%.

13. The array substrate according to claim 1, further including a top substrate, a plurality of thin-film transistors (TFTs) and a plurality of pixel electrodes placed in the subpixel regions between the top substrate and the bottom substrate, a gate of a TFT being connected to a gate line, a source of the TFT being connected to a data line, and a drain of the TFT being connected to a pixel electrode.

14. A touch display panel, including one or more of the array substrates according to claim 1.

15. The touch display panel according to claim 14, comprises a processing unit for detecting a touch motion by reading signals from the self-capacitance electrode.

16. A display apparatus, including one or more of the display panels according to claim 14.

17. A method for driving a touch display panel according to claim 14, comprising:
    in a display period, a processing unit applying a common electrode signal on the common electrode pads; and
    in a touch-sensing period, the processing unit applying a touch signal on the self-capacitance electrodes and determining a location of the touch motion based on the capacitance change on the self-capacitance electrodes, wherein the touch display panel displays a frame during the display period and the touch sensing-period.

18. The method according to claim 17, wherein the touch signal is a periodic pulse signal.

* * * * *